United States Patent
Sakurai et al.

(10) Patent No.: US 11,566,094 B2
(45) Date of Patent: Jan. 31, 2023

(54) MODIFIED CONJUGATED DIENE RUBBER

(71) Applicants: ZEON CORPORATION, Tokyo (JP); SUMITOMO CHEMICAL COMPANY, LIMITED, Tokyo (JP); ZS ELASTOMERS CO., LTD., Tokyo (JP)

(72) Inventors: Takuro Sakurai, Tokyo (JP); Takashi Iizuka, Tokyo (JP); Mana Fujii, Sodegaura (JP); Hisakatsu Hama, Sodegaura (JP)

(73) Assignees: ZEON CORPORATION, Tokyo (JP); SUMITOMO CHEMICAL COMPANY, LIMITED, Tokyo (JP); ZS ELASTOMERS CO., LTD., Tokyo (JP)

( * ) Notice: Subject to any disclaimer, the term of this patent is extended or adjusted under 35 U.S.C. 154(b) by 428 days.

(21) Appl. No.: 16/753,855

(22) PCT Filed: Sep. 28, 2018

(86) PCT No.: PCT/JP2018/036454
§ 371 (c)(1),
(2) Date: Apr. 6, 2020

(87) PCT Pub. No.: WO2019/073829
PCT Pub. Date: Apr. 18, 2019

(65) Prior Publication Data
US 2020/0283556 A1 Sep. 10, 2020

(30) Foreign Application Priority Data
Oct. 13, 2017 (JP) .............................. JP2017-199794

(51) Int. Cl.
*C08F 236/10* (2006.01)
*C08K 3/36* (2006.01)
*B60C 1/00* (2006.01)
*B60C 11/00* (2006.01)

(52) U.S. Cl.
CPC .......... *C08F 236/10* (2013.01); *B60C 1/0016* (2013.01); *B60C 11/0008* (2013.01); *C08K 3/36* (2013.01); *B60C 2011/0025* (2013.01)

(58) Field of Classification Search
CPC ............ C08K 3/36; B60C 1/00; B60C 11/00; C08F 236/10
USPC ....................................................... 524/575
See application file for complete search history.

(56) References Cited

U.S. PATENT DOCUMENTS

| 2008/0275184 | A1* | 11/2008 | Karato | ................ C07D 417/06 525/105 |
| 2011/0245398 | A1 | 10/2011 | Hama et al. | |
| 2012/0041135 | A1 | 2/2012 | Ito et al. | |
| 2012/0190770 | A1* | 7/2012 | Ito | ............................ C08K 3/36 526/217 |
| 2014/0018490 | A1 | 1/2014 | Taguchi et al. | |
| 2014/0114014 | A1 | 4/2014 | Tokimune et al. | |
| 2017/0158797 | A1 | 6/2017 | Ueda et al. | |
| 2018/0251576 | A1 | 9/2018 | Adachi et al. | |
| 2020/0262956 | A1 | 8/2020 | Averkov et al. | |

FOREIGN PATENT DOCUMENTS

| CN | 109906235 A | 6/2019 |
| JP | 2011-225809 A | 11/2011 |
| JP | 2012-197406 A | 10/2012 |
| JP | 2014-193983 A | 10/2014 |
| JP | 2018-119104 A | 8/2018 |
| JP | 2018-119105 A | 8/2018 |
| SG | 10201800553 S | 8/2018 |
| SG | 10201800557 Y | 8/2018 |
| WO | 2013/018424 A1 | 2/2013 |
| WO | 2015/046392 A1 | 4/2015 |
| WO | 2015/152039 A1 | 10/2015 |
| WO | 2017/047451 A1 | 3/2017 |
| WO | 2018/084733 A1 | 5/2018 |

OTHER PUBLICATIONS

Jan. 8, 2019 Search Report issued in International Patent Application No. PCT/JP2018/036454.
Jun. 9, 2021 Search Report issued in European Patent Application No. 18865986.6.
Zhu et al., "Paint Basic Tutorial", Southwest Transportation University Publishing Company, (2012), pp. 92.
Higashi et al., "Practical Adhesive Raw Material Handbook", National Defense Industry Publishing House, (1999); pp. 178.
Mar. 14, 2022 Office Action issued in Chinese Patent Application No. 201880063888.X.
Apr. 14, 2020 International Preliminary Report on Patentability issued in International Patent Application No. PCT/JP2018/036454.

* cited by examiner

*Primary Examiner* — Deve V Hall
(74) *Attorney, Agent, or Firm* — Oliff PLC

(57) ABSTRACT

A modified conjugated diene rubber having a modifying structure derived from a siloxane compound at at least one terminal of a polymer chain containing conjugated diene monomer unit and a monomer unit of a vinyl compound having a functional group interactive with silica.

7 Claims, No Drawings

MODIFIED CONJUGATED DIENE RUBBER

TECHNICAL FIELD

The present invention relates to a modified conjugated diene rubber, and more specifically relates to a modified conjugated diene rubber which can be prepared into a rubber composition which is effectively prevented from adhering to rolls and can provide a cross-linked rubber having excellently low heat buildup, high wet grip, and high operation stability.

BACKGROUND ART

In recent years, environmental and resource issues have led to strong demands for tires for automobiles having lower fuel consumption, and safety concerns have led to demands for higher wet grip. Cross-linked rubbers prepared from a rubber composition comprising a rubber and silica as a filler have lower heat buildup than that of cross-linked rubbers prepared from a rubber composition comprising carbon black, and thus result in a reduction in rolling resistance when incorporated in tires. For this reason, tires having excellently low fuel consumption can be obtained by producing tires using a cross-linked rubber prepared from a rubber composition containing silica.

A variety of attempts have been made in rubbers contained in such a rubber composition to increase the compatibility between the rubbers and silica. For example, in Patent Document 1, a technique of imparting compatibility with silica to a rubber itself is examined, in which monomer components including a silicon-containing vinyl compound and a conjugated diene compound are polymerized in the presence of a specific polymerization initiator when a rubber polymer is prepared through solution polymerization.

RELATED ART

Patent Documents

Patent Document 1: WO2013/018424

SUMMARY OF THE INVENTION

Problem to be Solved by the Invention

In consideration of a recently increasing demand for the performance of tires for automobiles, new development of tires hereafter requires a rubber which can provide a cross-linked rubber having lower heat buildup and higher wet grip than those of conventional rubbers such as the rubber disclosed in Patent Document 1.

The present invention has been made in consideration of such a problem, and an object of the present invention is to provide a modified conjugated diene rubber which can be prepared into a rubber composition which is effectively prevented from adhering to rolls and can provide a cross-linked rubber having excellently low heat buildup, high wet grip, and high operation stability.

Means for Solving Problems

The present inventors, who have conducted extensive research to achieve the above goal, have found that the goal can be achieved by a modified conjugated diene rubber in which a modifying structure derived from a siloxane compound is introduced to at least one end of a polymer chain containing conjugated diene monomer unit and a monomer unit of a vinyl compound having a functional group interactive with silica, and thus have completed the present invention.

In other words, the present invention provides a modified conjugated diene rubber having a modifying structure derived from a siloxane compound at at least one end of a polymer chain containing conjugated diene monomer unit and a monomer unit of a vinyl compound having a functional group interactive with silica.

In the modified conjugated diene rubber according to the present invention, the monomer unit of a vinyl compound having a functional group interactive with silica are preferably unit represented by General Formula (1):

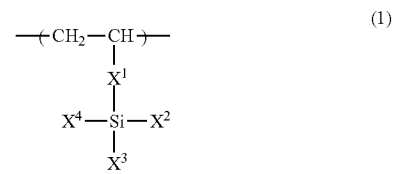

(1)

where $X^1$ represents a chemical single bond or a hydrocarbylene group, and $X^2$, $X^3$, and $X^4$ each independently represent a hydroxyl group, a substituted amino group, a hydrocarbyloxy group, or an optionally substituted hydrocarbyl group.

In the modified conjugated diene rubber according to the present invention, the siloxane compound is preferably a polyorganosiloxane represented by General Formula (2):

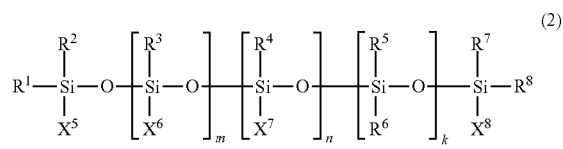

(2)

where $R^1$ to $R^8$, which may be the same or different, are a $C_1$ to $C_6$ alkyl or $C_6$ to $C_{12}$ aryl group; $X^5$ and $X^8$, which may be the same or different, are any of those selected from the group consisting of $C_1$ to $C_6$ alkyl groups, $C_6$ to $C_{12}$ aryl groups, $C_1$ to $C_5$ alkoxy groups, and $C_4$ to $C_{12}$ groups having an epoxy group; $X^6$ is a $C_1$ to $C_5$ alkoxy group or a $C_4$ to $C_{12}$ group having an epoxy group, and when a plurality of $X^6$s is present, these may be the same or different; $X^7$ is a group containing 2 to 20 repeating unit of an alkylene glycol, and when a plurality of $X^7$s is present, these may be the same or different; m is an integer of 1 to 200; n is an integer of 0 to 200; k is an integer of 0 to 200; and m+n+k is 1 or more.

The present invention provides a method for producing a modified conjugated diene rubber, the method comprising the steps of:

polymerizing monomers including a conjugated diene compound and a vinyl compound having a functional group interactive with silica in an inert solvent, thereby providing a conjugated diene polymer chain having an active terminal; and reacting a siloxane compound with the active terminal of the conjugated diene polymer chain having an active terminal.

The present invention also provides a rubber composition comprising a rubber ingredient containing the modified conjugated diene rubber according to any of the embodiments above, and silica.

Preferably, the rubber composition according to the present invention further comprises a cross-linking agent.

Furthermore, the present invention provides a cross-linked rubber prepared by cross-linking the rubber composition, and a tire comprising the cross-linked rubber.

Effects of Invention

The present invention can provide a modified conjugated diene rubber which can be prepared into a rubber composition which is effectively prevented from adhering to rolls and can provide a cross-linked rubber having excellently low heat buildup, high wet grip, and high operation stability. The present invention can also provide a method of producing such a modified conjugated diene rubber, and a rubber composition, a cross-linked rubber, and a tire comprising such a modified conjugated diene rubber.

DESCRIPTION OF EMBODIMENTS

<Modified Conjugated Diene Rubber>

The modified conjugated diene rubber according to the present invention has a modifying structure derived from a siloxane compound at at least one end of a polymer chain containing conjugated diene monomer unit and a monomer unit of a vinyl compound having a functional group interactive with silica.

The modified conjugated diene rubber according to the present invention described above can be prepared into a rubber composition which is effectively prevented from adhering to rolls and can provide a cross-linked rubber having excellently low heat buildup, high wet grip, and high operation stability.

In particular, the present inventors have conducted extensive research on a further reduction in heat buildup and further enhancement in wet grip in consideration of the recently increasing demand for the performance of tires for automobiles, and have found that higher compatibility with a filler such as silica can be provided by copolymerizing a conjugated diene compound with a vinyl compound having a functional group interactive with silica and introducing a modifying structure derived from a siloxane compound to at least one end of the polymer chain, and such high compatibility leads to further reduced heat buildup and further enhanced wet grip and also leads to excellent operation stability in addition to low heat buildup and high wet grip. In particular, because the operation stability can be enhanced by sufficiently demonstrated reinforcing properties of the filler such as silica, it is considered that the above structure enables the filler such as silica to sufficiently demonstrate reinforcing properties.

Furthermore, in addition to this, the present inventors have examined and found that the modified conjugated diene rubber according to the present invention having such a structure also has an unexpected effect, which is completely different from reduced heat buildup and enhanced wet grip and indicates that when the rubber is prepared into a rubber composition containing a filler such as silica and the rubber composition is processed into sheets and the like using rolls, the adhesion of the rubber composition to the rolls can be effectively reduced. In particular, when the rubber composition is processed into sheets and the like using rolls, such effectively reduced adhesion to the roll also leads to higher processability.

Examples of conjugated diene compounds for forming the conjugated diene monomer unit include, but should not be limited to, 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, and the like. Among these, preferred are 1,3-butadiene and isoprene. These conjugated diene compounds may be used alone or in combination.

The proportion of the conjugated diene monomer unit in the polymer chain constituting the modified conjugated diene rubber according to the present invention is preferably 50 to 99.99 wt %, more preferably 55 to 94.98 wt %, further more preferably 60 to 89.95 wt %, particularly preferably 65 to 84.90 wt %, although not particularly limited thereto. By choosing the proportion of the conjugated diene monomer unit within the above ranges, the production of the modified conjugated diene rubber is facilitated.

The vinyl compound having a functional group interactive with silica for forming the monomer unit of the vinyl compound having a functional group interactive with silica can be any compound having a functional group interactive with silica and a vinyl group. Here, the functional group interactive with silica indicates a functional group which can form a covalent bond between the functional group and the silica surface or can cause an intermolecular force weaker than the covalent bond (such as ion-dipole interaction, dipole-dipole interaction, hydrogen bond, or van der Waals force). Examples of such a functional group interactive with silica include, but should not be limited to, nitrogen atom-containing functional groups, silicon atom-containing functional groups, oxygen atom-containing functional groups, and the like. Among these, silicon atom-containing functional groups are preferred because they are highly interactive with silica. In other words, as the vinyl compound having a functional group interactive with silica, a vinyl compound having a silicon atom-containing functional group is preferably used. As a result of using a vinyl compound having a silicon atom-containing functional group, monomer unit of the vinyl compound having a silicon atom-containing functional group are introduced in the modified conjugated diene rubber.

Thus, the monomer unit of the vinyl compound having a functional group interactive with silica are not particularly limited as long as they are monomer unit derived from the vinyl compound having a functional group interactive with silica. From the viewpoint of ensuring further reduced heat buildup and further enhanced wet grip, monomer unit of vinyl compounds having a silicon atom-containing functional group are preferable, and unit represented by General Formula (1) below are more preferable.

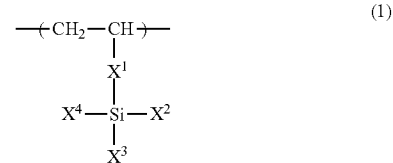
(1)

where $X^2$ represents a chemical single bond or a hydrocarbylene group, and $X^2$, $X^3$ and $X^4$ each independently represent a hydroxyl group, a substituted amino group, a hydrocarbyloxy group, or an optionally substituted hydrocarbyl group.

The unit represented by General Formula (1) can be foiled using a vinyl compound containing a silicon atom-containing functional group represented by General Formula (3), for example.

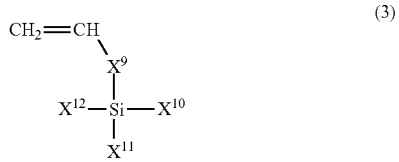
(3)

where $X^9$ represents a chemical single bond or a hydrocarbylene group, and $X^{10}$, $X^{11}$, and $X^{12}$ each independently represent a substituted amino group, a hydrocarbyloxy group, or an optionally substituted hydrocarbyl group.

$X^1$ in the unit represented by General Formula (1) corresponds to $X^9$ in the compound represented by General Formula (3). $X^2$, $X^3$, and $X^4$ in the unit represented by General Formula (1) correspond to $X^{10}$, $X^{11}$, and $X^{12}$ in the compound represented by General Formula (3), respectively. For this reason, $X^1$, $X^2$, $X^3$, and $X^4$ in the unit represented by General Formula (1) may be the same as $X^9$, $X^{10}$, $X^{11}$, and $X^{12}$ in the compound represented by General Formula (3). If a compound represented by General Formula (3) where at least one of $X^{10}$, $X^{11}$, and $X^{12}$ is a substituted amino group or a hydrocarbyloxy group is used, at least one of $X^{10}$, $X^{11}$, and $X^{12}$ can be converted into a hydroxyl group as a result of hydrolysis of the substituted amino group or the hydrocarbyloxy group at any timing in any step.

In General Formula (3), $X^9$ is a chemical single bond or a hydrocarbylene group, preferably a chemical single bond. Examples of the hydrocarbylene group include alkylene, alkenediyl, and arylene groups, groups of arylene groups bonded to alkylene groups, and the like.

Examples of the alkylene groups include a methylene group, an ethylene group, a trimethylene group, and the like. Examples of the alkenediyl groups include a vinylene group, an ethylene-1,1-diyl group, and the like. Examples of the arylene groups include a phenylene group, a naphthylene group, a biphenylene group, and the like. Examples of the groups of arylene groups bonded to alkylene groups include a group of a phenylene group bonded to a methylene group, a group of a phenylene group bonded to an ethylene group, and the like. If $X^9$ is the hydrocarbylene group, $X^9$ is preferably an arylene group, more preferably a phenylene group.

In General Formula (3), $X^{10}$, $X^{11}$, and $X^{12}$ each independently represent a substituted amino group, a hydrocarbyloxy group, or an optionally substituted hydrocarbyl group. It is preferred that at least one of $X^{10}$, $X^{11}$, and $X^{12}$ be the substituted amino group, and it is more preferred that two of $X^{10}$, $X^{11}$, and $X^{12}$ be the substituted amino groups.

A suitable substituted amino group which can form $X^{10}$, $X^{11}$, and $X^{12}$ is a group represented by General Formula (4):

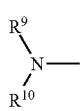
(4)

where $R^9$ and $R^{10}$ may or may not be bonded to each other; if $R^9$ and $R^{10}$ are not bonded to each other, $R^9$ and $R^{10}$ each independently represent an optionally substituted hydrocarbyl group or a trihydrocarbylsilyl group; if $R^9$ and $R^{10}$ are bonded to each other, $R^9$ and $R^{10}$ represent a hydrocarbylene group optionally containing a nitrogen atom and/or an oxygen atom.

Examples of the hydrocarbyl group which can form $R^9$ and $R^{10}$ include linear alkyl groups such as a methyl group, an ethyl group, a n-propyl group, an isopropyl group, a n-butyl group, an isobutyl group, a sec-butyl group, a tert-butyl group, a n-pentyl group, a n-hexyl group, and a n-octyl group; cyclic alkyl groups such as a cyclopentyl group and a cyclohexyl group; aryl groups such as a phenyl group, a benzyl group, and a naphthyl group; and the like. Among these, the linear alkyl groups are preferred, and the methyl group or the ethyl group is more preferred.

If the hydrocarbyl group which can form $R^9$ and $R^{10}$ has a substituent, examples thereof include hydrocarbyl groups having a hydrocarbyloxy group as a substituent. Examples of the hydrocarbyl groups having a hydrocarbyloxy group as a substituent include alkoxyalkyl groups such as a methoxymethyl group, an ethoxymethyl group, and a methoxyethyl group; aryloxyalkyl groups such as a phenoxymethyl group; and the like.

Specific examples of the trihydrocarbylsilyl group which can form $R^9$ and $R^{10}$ include trialkylsilyl groups such as a trimethylsilyl group, a triethylsilyl group, a tert-butyldimethylsilyl group, and the like.

If $R^9$ and $R^{10}$ are bonded to each other, examples of the hydrocarbylene group which can form $R^9$ and $R^{10}$ include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; alkenediyl groups such as a pentan-2-ene-1,5-diyl group; and the like. If the hydrocarbylene group that can form $R^9$ and $R^{10}$ contains a nitrogen atom and/or an oxygen atom, examples of the hydrocarbylene group containing a nitrogen atom and/or an oxygen atom include a group represented by —CH=N—CH=CH—, a group represented by —CH=N—CH$_2$—CH$_2$—, a group represented by —CH$_2$—CH$_2$—O—CH$_2$—CH$_2$—, and the like.

Preferably, $R^9$ and $R^{10}$ are an alkyl group or are bonded to each other to form an alkylene group. $R^9$ and $R^{10}$ are more preferably an alkyl group. $R^9$ and $R^{10}$ are still more preferably a methyl group or an ethyl group.

In General Formula (4), if $R^9$ and $R^{10}$ are hydrocarbyl groups, specific examples of the group represented by General Formula (4) include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; diarylamino groups such as a diphenylamino group; and the like. Among these, the dialkylamino groups are preferred, and the dimethylamino group, the diethylamino group, and the di-n-butylamino group are more preferred.

In General Formula (4), if $R^9$ and $R^{10}$ each are a hydrocarbyl group having a hydrocarbyloxy group as a substituent, specific examples of the group represented by General Formula (4) include di(alkoxyalkyl)amino groups such as a di(methoxymethyl)amino group and a di(ethoxymethyl)amino group, and the like.

If $R^9$ and $R^{10}$ in General Formula (4) are trihydrocarbylsilyl groups, specific examples of the group represented by General Formula (4) include trialkylsilyl group-containing amino groups such as a bis(trimethylsilyl)amino group, a bis(tert-butyldimethylsilyl)amino group, and a N-trimethylsilyl-N-methylamino group, and the like.

If $R^9$ and $R^{10}$ in General Formula (4) are bonded to each other to form a hydrocarbylene group, specific examples of the group represented by General Formula (4) include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group, and the like.

If $R^9$ and $R^{10}$ in General Formula (4) are bonded to each other to form a hydrocarbylene group containing a nitrogen atom and/or an oxygen atom, specific examples of the group represented by General Formula (4) include a 1-imidazolyl group, a 4,5-dihydro-1-imidazolyl group, a morpholino group, and the like.

The group represented by General Formula (4) is preferably a dialkylamino group and a 1-alkyleneimino group. More preferred are dialkylamino groups, and still more preferred are a dimethylamino group, a diethylamino group, and a di-n-butylamino group.

Examples of the hydrocarbyloxy group that can form $X^{10}$, $X^{11}$, and $X^{12}$ in General Formula (3) include alkoxy groups such as a methoxy group, an ethoxy group, a n-propoxy group, an isopropoxy group, a n-butoxy group, a sec-butoxy group, and a tert-butoxy group; aryloxy groups such as a phenoxy and a benzyloxy group; and the like.

Examples of the hydrocarbyl group that can form $X^{10}$, $X^{11}$ and $X^{12}$ in General Formula (3) include alkyl groups such as a methyl group, an ethyl group, a n-propyl group, an isopropyl group, a n-butyl group, a sec-butyl group, and a tert-butyl group; aryl groups such as a phenyl group, a 4-methyl-1-phenyl group, and a benzyl group; and the like.

If the hydrocarbyl group that can form $X^{10}$, $X^{11}$ and $X^{12}$ has a substituent, examples thereof include hydrocarbyl groups having a hydrocarbyloxy group as a substituent. Examples thereof include alkoxyalkyl groups such as a methoxymethyl group, an ethoxymethyl group, and an ethoxyethyl group, and the like.

If in General Formula (3), $X^9$ is a chemical single bond and one of $X^{10}$, $X^{11}$, and $X^{12}$ is a substituted amino group, specific examples of the vinyl compound containing a silicon atom-containing functional group represented by General Formula (3) include (dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino)diethylvinylsilane, (ethylmethylamino)diethylvinylsilane, (di-n-propylamino)diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxy alkyl)vinylsilanes such as (dimethylamino)di(methoxymethyl)vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl)vinylsilane, and (diethylamino)di(ethoxyethyl)vinylsilane; cyclic aminodialkylvinylsilane compounds such as pyrrolidinodimethylvinylsilane, piperidinodimethylvinylsilane, hexamethyleneiminodimethylvinylsilane, 4,5-dihydroimidazolyldimethylvinylsilane, and morpholinodimethylvinylsilane; and the like.

If in General Formula (3), $X^9$ is a hydrocarbylene group and one of $X^{10}$, $X^{11}$, and $X^{12}$ is a substituted amino group, specific examples of the vinyl compound containing a silicon atom-containing functional group represented by General Formula (3) include (dialkylamino)dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane, and the like.

If in General Formula (3), $X^9$ is a chemical single bond and two of $X^{10}$, $X^{11}$, and $X^{12}$ are substituted amino groups, specific examples of the vinyl compound containing a silicon atom-containing functional group represented by General Formula (3) include bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(dimethylamino)ethoxyethylvinylsilane; bis(cyclic amino)alkylvinylsilane compounds such as bis(pyrrolidino)methylvinylsilane, bis(piperidino)methylvinylsilane, bis(hexamethyleneimino)methylvinylsilane, bis(4,5-dihydroimidazolyl)methylvinylsilane, and bis(moipholino)methylvinylsilane; and the like.

If in General Formula (3), $X^9$ is a hydrocarbylene group and one of $X^{10}$, $X^{11}$, and $X^{12}$ is a substituted amino group, specific examples of the vinyl compound containing a silicon atom-containing functional group represented by General Formula (3) include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane, and the like.

If in General Formula (3), $X^9$ is a chemical single bond and three of $X^{10}$, $X^{11}$, and $X^{12}$ are substituted amino groups, specific examples of the vinyl compound containing a silicon atom-containing functional group represented by General Formula (3) include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane, and the like.

If in General Formula (3), $X^9$ is a hydrocarbylene group and three of $X^{10}$, $X^{11}$, and $X^{12}$ are substituted amino groups, specific examples of the vinyl compound containing a silicon atom-containing functional group represented by General Formula (3) include tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane, and the like.

If in General Formula (3), $X^9$ is a chemical single bond and none of $X^{10}$, $X^{11}$, and $X^{12}$ is a substituted amino group, specific examples of the vinyl compound containing a silicon atom-containing functional group represented by General Formula (3) include trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; substituted alkoxyvinylsilane compounds such as tris(β-methoxyethoxy)vinylsilane; and the like.

Among these compounds represented by General Formula (3), preferred are those where $X^9$ is a chemical single bond, and more preferred are those where $X^9$ is a chemical single bond and two of $X^{10}$, $X^{11}$, and $X^{12}$ are substituted amino groups. Particularly preferred are those where $X^9$ is a chemical single bond and two of $X^{10}$, $X^{11}$ and $X^{12}$ are dialkylamino groups.

Among these compounds represented by General Formula (3), preferred are bis(dimethylamino)methylvinylsilane, bis(diethylamino)methylvinylsilane, and bis(di-n-butylamino)methylvinylsilane, and particularly preferred is bis(diethylamino)methylvinylsilane.

Examples of the vinyl compound having a functional group interactive with silica other than the compound represented by General Formula (3) include bis(trialkylsilyl)aminostyrenes such as 4-N,N-bis(trimethylsilyl)aminostyrene and 3-N,N-bis(trimethylsilyl)aminostyrene; bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, and 3-bis(trimethylsilyl)aminoethylstyrene; pyrrolidinoethylstyrene; and the like. Among these, pyrrolidinoethylstyrene is preferred. The pyrrolidinoethylstyrene may be in any of the ortho, meta, and para forms. The meta form and the para form are preferred, and a mixture of the meta form and the para form is more preferred.

The proportion of the monomer unit of the vinyl compound having a functional group interactive with silica in the polymer chain constituting the modified conjugated diene rubber according to the present invention is preferably 0.01 to 20 wt %, more preferably 0.02 to 2 wt %, further more preferably 0.05 to 1 wt %, particularly preferably 0.1 to 0.8 wt %. Control of the proportion of the monomer unit of the vinyl compound having a functional group interactive with silica within the above ranges results in a more remarkable effect of reducing adhesion to rolls and a more remarkable effect of reducing the heat buildup and improving the wet grip and the operation stability.

From the viewpoint of providing a cross-linked rubber having further reduced heat buildup and further enhanced wet grip, the modified conjugated diene rubber according to the present invention preferably contains aromatic vinyl monomer unit in addition to the conjugated diene monomer unit and the monomer unit of the vinyl compound having a functional group interactive with silica.

Examples of aromatic vinyl compounds for forming the aromatic vinyl monomer unit include styrene, methylstyrene, ethylstyrene, t-butylstyrene, α-methylstyrene, α-methyl-p-methylstyrene, chlorostyrene, bromostyrene, methoxystyrene, dimethylaminomethylstyrene, dimethylaminoethylstyrene, diethylaminomethylstyrene, diethylaminoethylstyrene, cyanoethylstyrene, vinylnaphthalene, and the like. Among these, styrene is preferred.

The proportion of the aromatic vinyl monomer unit in the polymer chain constituting the modified conjugated diene rubber according to the present invention is preferably 49.99 wt % or less, more preferably 5 to 44.98 wt %, further more preferably 10 to 39.95 wt %, particularly preferably 15 to 34.90 wt %. Control of the proportion of the aromatic vinyl monomer unit results in a more remarkable effect of reducing the heat buildup and improving the wet grip.

The modified conjugated diene rubber according to the present invention may further contain different monomer unit other than the conjugated diene monomer unit, the monomer unit of the vinyl compound having a functional group interactive with silica, and the aromatic vinyl monomer unit. Examples of other compounds forming such different monomer unit include linear olefin compounds such as ethylene, propylene, and 1-butene; cyclic olefin compounds such as cyclopentene and 2-norbornene; non-conjugated diene compounds such as 1,5-hexadiene, 1,6-heptadiene, 1,7-octadiene, dicyclopentadiene, and 5-ethylidene-2-norbornene; and the like. The proportion of the different monomer unit in the polymer chain constituting the modified conjugated diene rubber is preferably 10 wt % or less, more preferably 5 wt % or less.

In the modified conjugated diene rubber according to the present invention, a modifying structure derived from a siloxane compound is introduced to at least one end of the polymer chain containing the above monomer unit. The modifying structure derived from a siloxane compound may be introduced via a modifying structure derived from another modifier.

The siloxane compound may be any siloxane compound as long as it has a main chain of siloxane bonds (—Si—O—). Preferred are organosiloxanes having an organic group in the side chain, and more preferred is a polyorganosiloxane represented by General Formula (2):

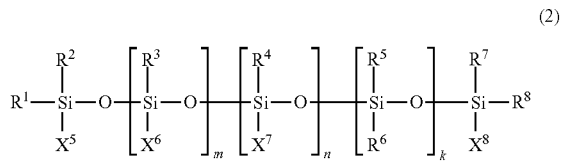

(2)

where $R^1$ to $R^8$, which may be the same or different, are a $C_1$ to $C_6$ alkyl or $C_6$ to $C_{12}$ aryl group; $X^5$ and $X^8$, which may be the same or different, are any of those selected from the group consisting of $C_1$ to $C_6$ alkyl groups, $C_6$ to $C_{12}$ aryl groups, $C_1$ to $C_5$ alkoxy groups, and $C_4$ to $C_{12}$ groups having an epoxy group; $X^6$ is a $C_1$ to $C_5$ alkoxy group or a $C_4$ to $C_{12}$ group having an epoxy group, and when a plurality of $X^6$s is present, these may be the same or different; $X^7$ is a group containing 2 to 20 repeating unit of an alkylene glycol, and when a plurality of $X^7$s is present, these may be the same or different; m is an integer of 1 to 200; n is an integer of 0 to 200; k is an integer of 0 to 200; and m+n+k is 1 or more.

In the polyorganosiloxane represented by General Formula (2), examples of the $C_1$ to $C_6$ alkyl groups which can form $R^1$ to $R^8$, $X^5$, and $X^8$ in General Formula (4) include a methyl group, an ethyl group, a n-propyl group, an isopropyl group, a butyl group, a pentyl group, a hexyl group, a cyclohexyl group, and the like. Examples of the $C_6$ to $C_{12}$ aryl groups include a phenyl group, a methylphenyl group, and the like. Among these, preferred are methyl and ethyl groups from the viewpoint of readiness of the production of the polyorganosiloxane itself.

In the polyorganosiloxane represented by General Formula (2), examples of the $C_1$ to $C_5$ alkoxy groups which can form $X^5$, $X^6$, and $X^8$ include a methoxy group, an ethoxy group, a propoxy group, an isopropoxy group, a butoxy group, and the like. Among these, preferred are methoxy and ethoxy groups from the viewpoint of readiness of the production of the polyorganosiloxane itself.

Furthermore, in the polyorganosiloxane represented by General Formula (2), examples of the $C_4$ to $C_{12}$ groups having an epoxy group which can form $X^5$, $X^6$, and $X^8$ include groups represented by General Formula (5):

$$-Z^1-Z^2-E \quad (5)$$

where $Z^1$ is a $C_1$ to $C_{10}$ alkylene or alkylarylene group, $Z^2$ is a methylene group, a sulfur atom, or an oxygen atom, and E is a $C_2$ to $C_{10}$ hydrocarbon group having an epoxy group.

The group represented by General Formula (5) is preferably those where $Z^2$ is an oxygen atom, more preferably those where $Z^2$ is an oxygen atom and E is a glycidyl group, particularly preferably those where $Z^1$ is a $C_1$ to $C_3$ alkylene group, $Z^2$ is an oxygen atom, and E is a glycidyl group.

In the polyorganosiloxane represented by General Formula (2), $X^5$ and $X^8$ are preferably a $C_4$ to $C_{12}$ group having an epoxy group or a $C_1$ to $C_6$ alkyl group among the groups described above. $X^6$ is preferably a $C_4$ to $C_{12}$ group having an epoxy group among the groups described above. Furthermore, it is more preferred that $X^5$ and $X^8$ be a $C_1$ to $C_6$ alkyl group and $X^6$ be a $C_4$ to $C_{12}$ group having an epoxy group.

In the polyorganosiloxane represented by General Formula (2), $X^7$, namely, the group containing 2 to 20 repeating unit of an alkylene glycol is preferably a group represented by General Formula (6):

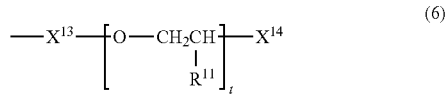

(6)

where t is an integer of 2 to 20, $X^{13}$ is a $C_2$ to $C_{10}$ alkylene or alkylarylene group, $R^{11}$ is a hydrogen atom or a methyl group, and $X^{14}$ is a $C_1$ to $C_{10}$ alkoxy or aryloxy group. Among these, preferred groups are those where t is an integer of 2 to 8, $X^{13}$ is a $C_3$ alkylene group, $R^{11}$ is a hydrogen atom, and $X^{14}$ is a methoxy group.

In the polyorganosiloxane represented by General Formula (2), m is an integer of 1 to 200, preferably 20 to 150, more preferably 30 to 120. At m of 1 to 200, the polyorganosiloxane itself represented by General Formula (2) can be more readily produced, and can be more easily handled because the viscosity is not excessively high.

In the polyorganosiloxane represented by General Formula (2), n is an integer of 0 to 200, preferably 0 to 150, more preferably 0 to 120. k is an integer of 0 to 200, preferably 0 to 150, more preferably 0 to 130. The total numeric value of m, n, and k is 1 or more, preferably 1 to 400, more preferably 20 to 300, particularly preferably 30 to 250. If the total numeric value of m, n, and k is 1 or more, the reaction with the conjugated diene polymer chain containing the polyorganosiloxane represented by General Formula (2) and having an active terminal readily proceeds. If the total numeric value of m, n, and k is 400 or less, the polyorganosiloxane itself represented by General Formula (2) can be more readily produced, and can be more easily handled because the viscosity is not excessively high.

Examples of a method for producing the modified conjugated diene rubber according to the present invention include, but should not be limited to, a production method comprising the steps of:

polymerizing monomers including the conjugated diene compound and the vinyl compound having a functional group interactive with silica in an inert solvent, thereby providing a conjugated diene polymer chain having an active terminal; and reacting the siloxane compound with the active terminal of the conjugated diene polymer chain having an active terminal and the like.

The inert solvent used in the polymerization may be any inert solvent that is usually used in solution polymerization and does not inhibit the polymerization reaction. Specific examples of the inert solvent include linear or branched aliphatic hydrocarbons such as propane, n-butane, isobutane, n-pentane, isopentane, n-hexane, propene, 1-butene, isobutene, trans-2-butene, cis-2-butene, 1-pentene, 2-pentene, 1-hexene, 2-hexene, and n-heptane; alicyclic hydrocarbons such as cyclopentane and cyclohexane; aromatic hydrocarbons such as benzene, ethylbenzene, toluene, and xylene; ether compounds such as tetrahydrofuran and diethyl ether; and the like. These inert solvents may be used alone or in combination. Although not particularly limited, the amount of the inert solvent is chosen to provide a monomer concentration of, for example, 1 to 50 wt %, preferably 5 to 40 wt %.

The polymerization initiator used in the polymerization can be any polymerization initiator that enables polymerization of monomers including the conjugated diene compound and the vinyl compound having a functional group interactive with silica to yield the conjugated diene polymer chain having an active terminal. Specific examples thereof include polymerization initiators containing organic alkali metal compounds, organic alkaline earth metal compounds, and lanthanide-series metal compounds as the primary catalyst, and the like. Examples of the organic alkali metal compounds include organic monolithium compounds such as n-butyllithium, sec-butyllithium, t-butyllithium, hexyllithium, phenyllithium, ethyllithium, n-propyllithium, isopropyllithium, tert-octyllithium, n-decyllithium, 2-naphthyllithium, 2-butylphenyllithium, 4-phenylbutyllithium, hexyllithium, cyclopentyllithium, the reaction product of diisopropenylbenzene with butyllithium, and stilbenelithium; organic polyvalent lithium compounds such as dilithiomethane, 1,4-dilithiobutane, 1,4-dilithio-2-ethylcyclohexane, 1,3,5-trilithiobenzene, 1,3,5-tris(lithiomethyl)benzene, the reaction product of sec-butyllithium with diisopropenylbenzene, the reaction product of n-butyllithium with 1,3-butadiene and divinylbenzene, and reaction products of n-butyllithium with polyacetylene compounds; organic sodium compounds such as sodium naphthalene; organic potassium compounds such as potassium naphthalene; organic rubidium compounds; organic cesium compounds; and the like.

Besides, examples thereof include alkoxides, sulfonates, carbonates, and amides of lithium, sodium, and potassium, and the like. These may also be used in combination with other organic metal compounds. Furthermore, known organic alkali metal compounds disclosed in U.S. Pat. No. 5,708,092, British Patent No. 2,241,239, U.S. Pat. No. 5,527,753, and the like can also be used.

Examples of the organic alkaline earth metal compounds include di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diethylbarium, and the like. Examples of the polymerization initiators containing lanthanide-series metal compounds as the primary catalyst include polymerization initiators comprising salts of lanthanide-series metals (such as salts of carboxylic acids and phosphorus-containing organic acids with lanthanide-series metals such as lanthanum, cerium, praseodymium, neodymium, samarium, and gadolinium) as the primary catalyst, and cocatalysts such as alkylaluminum compounds, organic aluminum hydride compounds, and organic aluminum halide compounds; and the like. Among these polymerization initiators, the organic monolithium compounds and the organic polyvalent lithium compounds are preferably used, and the organic monolithium compounds are more preferably used. From the viewpoint of industrial availability and readiness in control of the polymerization reaction, n-butyllithium is particularly preferably used. The organic alkali metal compounds may be preliminarily reacted with secondary amines such as dibutylamine, dihexylamine, dibenzylamine, pyrrolidine, piperidine, hexamethyleneimine, and heptamethyleneimine, and may be used in the form of an organic alkali metal amide compound. These polymerization initiators may be used alone or in combination. Examples of the organic alkali metal amide compounds include, but should not be limited to, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium-N-methylpiperadide, lithium ethylpropylamide, lithium ethylbutylamide, lithium ethylbenzylamide, lithium methylphenethylamide, and the like.

Although the amount of the polymerization initiator to be used is determined according to the target molecular weight of the conjugated diene polymer chain, the amount is in the range of typically 1 to 50 mmol, preferably 1.5 to 20 mmol, more preferably 2 to 15 mmol relative to 1000 g of the monomers.

The polymerization temperature is in the range of typically −80 to +150° C., preferably 0 to 100° C., more preferably 30 to 90° C. Although the polymerization can be performed in any manner, that is, in batch or continuously, a batch method is preferably used to copolymerize the conjugated diene compound and the aromatic vinyl compound because the randomness of the bonding sequence of the conjugated diene monomer unit and the aromatic vinyl monomer unit is readily controlled. The bonding sequence of the monomer unit in the conjugated diene polymer chain may be any of a variety of bonding sequences such as block, tapered, and random sequences. Among these, a random sequence is preferable. A random copolymer can result in a cross-linked rubber having further reduced heat buildup.

In the polymerization of the monomers including the conjugated diene compound, a polar compound is preferably added to the inert solvent to adjust the vinyl bond content in the conjugated diene monomer unit in the resulting conjugated diene polymer chain. Examples of the polar compound include ether compounds such as dibutyl ether, tetrahydrofuran, and 2,2-di(tetrahydrofuryl)propane; tertiary amines such as tetramethylethylenediamine; alkali metal alkoxides; phosphine compounds; and the like. Among these, preferred are ether compounds and tertiary amines, more preferred are tertiary amines, and particularly preferred is tetramethylethylenediamine. These polar compounds may be used alone or in combination. The amount of the polar compound to be used is determined according to the target vinyl bond content, and is preferably 0.001 to 100 mol, more preferably 0.01 to 10 mol relative to 1 mol of the polymerization initiator. The use of the polar compound in an amount within this range facilitates the control of the vinyl bond content in the conjugated diene monomer unit, and prevents failures caused by deactivation of the polymerization initiator.

The vinyl bond content in the conjugated diene monomer unit in the conjugated diene polymer chain having an active terminal prepared through the polymerization is preferably 1 to 90 wt %, more preferably 3 to 85 wt %, particularly preferably 5 to 80 wt %. Control of the vinyl bond content in the conjugated diene monomer unit within this range results in a cross-linked rubber having further reduced heat buildup.

The weight average molecular weight (Mw) of the conjugated diene polymer chain having an active terminal, although not particularly limited, is preferably 50,000 to 1,000,000, more preferably 100,000 to 800,000, particularly preferably 150,000 to 700,000 as determined by gel permeation chromatography relative to polystyrene standards. Control of the weight average molecular weight (Mw) of the conjugated diene polymer chain having an active terminal within the above range results in a cross-linked rubber having a favorable balance between wet grip and low heat-buildup.

The conjugated diene polymer chain having an active terminal has a molecular weight distribution of preferably 1.0 to 3.0, more preferably 1.0 to 2.5, where the molecular weight distribution is represented as the ratio (Mw/Mn) of the weight average molecular weight (Mw) to the number average molecular weight (Mn). A molecular weight distribution (Mw/Mn) of the conjugated diene polymer chain having an active terminal within this range further facilitates the production of the modified conjugated diene rubber.

Next, the modifying structure derived from a siloxane compound is introduced to the terminal of the conjugated diene polymer chain by reacting the siloxane compound with the active terminal of the conjugated diene polymer chain having an active terminal, which is prepared by polymerizing the monomers including the conjugated diene compound and the vinyl group having a functional group interactive with silica.

The amount of the siloxane compound to be used in the reaction of the conjugated diene polymer chain having an active terminal with the siloxane compound is preferably 0.25 to 25 mol, more preferably 0.5 to 12.5 mol per 1 mol of the polymerization initiator used in the polymerization when expressed in terms of —Si—O— repeating unit contained in the siloxane compound. The use of the siloxane compound in an amount within the above ranges results in a cross-linked rubber having further reduced heat buildup.

Any method for reacting the siloxane compound with the conjugated diene polymer chain having an active terminal can be used without limitation. Examples thereof include mixing the compounds in a solvent capable of dissolving them; and the like. Examples of solvents usable in the exemplified method include the inert solvents listed above as those used in polymerization reaction. In this method, to simplify the procedure, it is preferred that the siloxane compound be added to the polymerization solution used in the polymerization for preparing the conjugated diene polymer chain having an active terminal. In addition, the siloxane compound is preferably added in the form of a solution in the inert solvent to the polymerization system, and the concentration of the solution is preferably in the range of 1 to 50 wt %. The reaction temperature is typically 0 to 120° C., although not particularly limited thereto. The reaction time is typically 1 minute to 1 hour, although not particularly limited thereto.

The siloxane compound can be added to the solution containing the conjugated diene polymer chain having an active terminal at any timing. Desirably, the siloxane compound is added to the solution in the state where the polymerization reaction has not been completed yet and the solution containing the conjugated diene polymer chain having an active terminal also contains the monomers, more specifically, in the state where the solution containing the conjugated diene polymer chain having an active terminal contains 100 ppm or more, more preferably 300 to 50,000 ppm of the monomers. By adding the siloxane compound in such a manner, side reactions of the conjugated diene polymer chain having an active terminal with impurities contained in the polymerization system can be prevented to control the reaction as intended. After the siloxane compound is added to and mixed with the solution of the conjugated diene polymer chain having an active terminal, an organic metal compound, such as n-butyllithium, sec-butyllithium, t-butyllithium, hexyllithium, phenyllithium, ethyllithium, n-propyllithium, isopropyllithium, tert-octyllithium, n-decyllithium, 2-naphthyllithium, 2-butylphenyllithium, 4-phenylbutyllithium, hexyllithium, cyclopentyllithium, the reaction product of diisopropenylbenzene with butyllithium, or stilbenelithium, may be further added thereto. This results in a rubber composition having enhanced processability (reduced compound Mooney viscosity).

By reacting the siloxane compound with the active terminals of the conjugated diene polymer chains having an active terminal, the modifying structure derived from the siloxane compound can be introduced to at least part of the terminals of the conjugated diene polymer chains. While the conjugated diene polymer chains after the reaction have the polymer chain terminals to which the modifying group derived from the siloxane compound is introduced, unmodified conjugated diene polymer chains not having the modification group derived from the siloxane compound may also be present.

In the state where the conjugated diene polymer chains having an active terminal before the reaction with the siloxane compound or residual conjugated diene polymer chains having an active terminal after the reaction with the siloxane compound are present, part of the active terminals of the conjugated diene polymer chains having an active terminal may be coupled or modified by adding a conventional coupling agent usually used or another modifier to the polymerization system within the range not inhibiting the effects of the present invention. Examples of modifiers usable in this case include, but should not be limited to, silicon atom-containing compounds other than the siloxane compound, nitrogen atom-containing compounds, and the like.

Preferably, after the reaction of the siloxane compound with the conjugated diene polymer chain having an active terminal, a polymerization terminator such as an alcohol (e.g., methanol, ethanol, or isopropanol) or water is added to deactivate unreacted active terminals.

After the deactivation of the active terminals of the conjugated diene polymer chains, an antioxidant such as a phenol-based stabilizer, a phosphorus-based stabilizer, or a sulfur-based stabilizer, a crumb forming agent, a scale inhibitor, and the like are added to the reaction solution as needed. Subsequently, the polymerization solvent is separated from the reaction solution by direct drying or steam stripping to recover the modified conjugated diene rubber. The modified conjugated diene rubber may be recovered as an oil extended rubber by mixing an extender oil with the polymerization solution before the separation of the polymerization solvent from the reaction solution.

Examples of the extender oil used to recover the modified conjugated diene rubber as an oil extended rubber include petroleum-based softening agents such as paraffin-based softening agents, aromatic softening agents, naphthene-based softening agents, plant-based softening agents, fatty acids, and the like. If the petroleum-based softening agent is used, the content of polycyclic aromatic compounds extracted by the method of IP 346 (the test method specified by THE INSTITUTE PETROLEUM of the U.K.) is preferably less than 3%. If the extender oil is used, the amount thereof to be used is preferably 5 to 100 parts by weight, more preferably 10 to 60 parts by weight, further more preferably 20 to 50 parts by weight relative to 100 parts by weight of the modified conjugated diene rubber.

The coupling ratio of the modified conjugated diene rubber according to the present invention is preferably 10 wt % or more, more preferably 15 wt % or more, particularly preferably 20 wt % or more, and is preferably 80 wt % or less, more preferably 75 wt % or less, particularly preferably 70 wt % or less, although not particularly limited thereto. A coupling ratio within the above ranges results in a cross-linked rubber having a favorable balance between mechanical strength and wear resistance. The coupling ratio refers to the weight fraction of polymer molecules having a molecular weight at least 1.8 times the peak top molecular weight of the conjugated diene polymer chain having an active terminal before the reaction with the siloxane compound and the optional coupling agent and modifier relative to the total weight of the final modified conjugated diene rubber. The molecular weight is measured by gel permeation chromatography relative to polystyrene standards.

The modified conjugated diene rubber according to the present invention has a weight average molecular weight (Mw) of preferably 50,000 to 5,000,000, more preferably 75,000 to 3,000,000, particularly preferably 100,000 to 1,000,000, which is measured by gel permeation chromatography relative to polystyrene standards. Control of the weight average molecular weight of the modified conjugated diene rubber within this range facilitates compounding of silica with a rubber composition containing such a modified conjugated diene rubber, and results in a rubber composition having further enhanced processability and thus a cross-linked rubber having further reduced heat buildup.

The modified conjugated diene rubber according to the present invention has a molecular weight distribution of preferably 1.1 to 3.0, more preferably 1.2 to 2.5, particularly preferably 1.2 to 2.2, where the molecular weight distribution is represented as the ratio (Mw/Mn) of the weight average molecular weight (Mw) to the number average molecular weight (Mn). Control of the molecular weight distribution (Mw/Mn) of the modified conjugated diene rubber within this range results in a cross-linked rubber having further reduced heat buildup.

The modified conjugated diene rubber according to the present invention has a Mooney viscosity ($ML_{1+4}$, 100° C.) of preferably 20 to 100, more preferably 30 to 90, particularly preferably 35 to 80. Note that if the modified conjugated diene rubber is an oil extended rubber, the oil extended rubber preferably has a Mooney viscosity within this range.

Although the modified conjugated diene rubber according to the present invention has any glass transition temperature (Tg), the glass transition temperature is preferably 20 to −110° C., more preferably 10 to −70° C. The glass transition temperature of the modified conjugated diene rubber according to the present invention can be appropriately adjusted, for example, by controlling the aromatic vinyl monomer unit content in the modified conjugated diene rubber and the vinyl bond content in the modified conjugated diene monomer unit.

<Rubber Composition>

The rubber composition according to the present invention is a composition prepared by adding silica to the rubber ingredient containing the modified conjugated diene rubber according to the present invention.

The rubber composition according to the present invention may contain other rubbers than the modified conjugated diene rubber according to the present invention above. The other rubbers indicate those such as natural rubbers (those may be reformed natural rubbers such as epoxidized natural rubbers (ENR), hydrogenated natural rubbers (HNR), deproteinized natural rubbers (DPNR), high purity natural rubbers (UPNR), grafted natural rubbers, and the like), polyisoprene rubbers, emulsion polymerized styrene-butadiene copolymer rubbers, solution polymerized styrene-butadiene copolymer rubbers, polybutadiene rubbers (those may be high-cis-BR or low-cis-BR, or may be polybutadiene rubbers containing crystal fibers made of a 1,2-polybutadiene polymer), styrene-isoprene copolymer rubbers, butadiene-isoprene copolymer rubbers, styrene-isoprene-butadiene copolymer rubbers, acrylonitrile-butadiene copolymer rubbers, acrylonitrile-styrene-butadiene copolymer rubbers, butyl rubbers (IIR), ethylene-propylene copolymers, chloroprene rubbers, nitrile chloroprene rubbers, and nitrile isoprene rubbers, where the modified conjugated diene rubber is excluded, for example. Among these, preferred are natural rubbers, polyisoprene rubbers, polybutadiene rubbers, and solution polymerized styrene-butadiene copolymer rubbers. These rubbers may be used alone or in combination, for example, as a combination of a natural rubber and a polybutadiene rubber, a natural rubber and a styrene-butadiene copolymer rubber, or the like.

In the rubber composition according to the present invention, the modified conjugated diene rubber according to the present invention occupies preferably 10 to 100 wt %, particularly preferably 50 to 100 wt % of the rubber ingredient in the rubber composition. If the rubber ingredient includes the modified conjugated diene rubber according to the present invention in such a proportion, a cross-linked rubber having excellently low heat buildup, high wet grip, and high operation stability can be obtained.

Examples of the silica used in the present invention include dry white carbon, wet white carbon, colloidal silica, sedimented silica, calcium silicate, aluminum silicate, and the like. Among these, preferred is wet white carbon containing hydrous silicic acid as the main component. A carbon-silica dual phase filler comprising carbon black and silica carried on the surface thereof may also be used. These silicas may be used alone or in combination. The nitrogen adsorption specific surface area (measured by the BET method according to ASTM D3037-81) of the silica to be used is preferably 20 to 400 $m^2/g$, more preferably 50 to 220 $m^2/g$, particularly preferably 80 to 170 $m^2/g$. The silica preferably has a pH of 5 to 10.

The silica to be used in the present invention has a dibutyl phthalate (DBP) absorption number in the range of preferably about 100 to about 400, particularly preferably about 150 to about 300.

Although the silica to be used in the present invention preferably has an average limit particle size in the range of 0.01 to 0.05 µm measured with an electronic microscope, the average limit particle size of the silica is not limited to this range and may be smaller or larger than that.

The silica to be used in the present invention can be, for example, a variety of commercially available silicas. Examples thereof include Hi-Sil 210, Hi-Sil 233, and Hi-Sil 243LD available from PPG Industries, Inc.; Zeosil 1115MP, Zeosil 1165MP, and Zeosil 165GR available from Rhodia S.A.; ULTRASIL VN2 and ULTRASIL VN3 available from EVONIK AG; and the like.

The compounding amount of silica in the rubber composition according to the present invention is preferably 10 to 250 parts by weight, more preferably 15 to 150 parts by weight, still more preferably 20 to 130 parts by weight relative to 100 parts by weight of the rubber ingredient in the rubber composition. The compounding amount of silica controlled within this range results in a cross-linked rubber having further enhanced wet grip, reduced heat buildup, and enhanced operation stability.

To provide further reduced heat buildup, a silane coupling agent may be further compounded with the rubber composition according to the present invention. The silane coupling agent is not particularly limited, and a variety of silane coupling agents can be used. In the present invention, sulfide-based, mercapto-based, protected mercapto-based (such as those having a carbonylthio group), thiocyanate-based, vinyl-based, amino-based, methacrylate-based, glycidoxy-based, nitro-based, epoxy-based, or chloro-based silane coupling agents can be suitably used. Specific examples of the silane coupling agents include bis(3-(triethoxysilyl) propyl) disulfide, bis(3-triethoxysilylpropyl) trisulfide, bis(3-(triethoxysilyl)propyl)tetrasulfide, γ-mercaptopropyltriethoxysilane, 3-[ethoxy-bis(3,6,9,12,15-pentaoxaoctacosan-1-yloxy)silyl]-1-propanethiol, 3-octanoylthio-1-propyl-triethoxysilane, 3-trimethoxysilyl-propyl-N,N-dimethylthiocarbamoyl tetrasulfide, γ-trimethoxysilylpropylbenzothiazyl tetrasulfide, 3-trimethoxysilyl-propylbenzothiazole tetrasulfide, 3-thiocyanate propyltriethoxysilane, vinyltriethoxysilane, N-(β-aminoethyl)-γ-aminopropyltrimethoxysilane, 3-trimethoxysilylpropylmethacrylate monosulfide, γ-glycidoxypropyltriethoxysilane, 3-nitropropyltrimethoxysilane, β-(3,4-epoxycyclohexyl) ethyltrimethoxysilane, 3-chloropropyltrimethoxysilane, and the like. NXT-Z100, NXT-Z30, NXT-Z45, NXT-Z60, NXT-Z45, and NXT available from Momentive Performance Materials Inc., Si69, Si75, and VP Si363 available from Evonik Degussa AG, and the like can also be used. These silane coupling agents may be used alone or in combination. One or two or more of these silane coupling agents may be preliminarily famed into an oligomer, and may be used in the oligomer form. The compounding amount of the silane coupling agent is preferably 0.1 to 30 parts by weight, more preferably 1 to 15 parts by weight relative to 100 parts by weight of silica.

Moreover, carbon blacks such as furnace black, acetylene black, thermal black, channel black, and graphite may be further compounded with the rubber composition according to the present invention. Among these, furnace black is preferred. These carbon blacks may be used alone or in combination. The compounding amount of carbon black is usually 120 parts by weight or less relative to 100 parts by weight of the rubber ingredient in the rubber composition.

Silica can be added to the rubber ingredient containing the modified conjugated diene rubber according to the present invention by any method, and a method of adding and kneading silica to and with a solid rubber material (dry kneading method), a method of adding silica to a solution containing the modified conjugated diene rubber, followed by coagulation and drying (wet kneading method), and the like can be used.

Preferably, the rubber composition according to the present invention further contains a cross-linking agent. Examples of the cross-linking agent include sulfur, sulfur-containing compounds such as halogenated sulfur, organic peroxides, quinone dioximes, organic polyvalent amine compounds, alkylphenol resins having a methylol group, and the like. Among these, sulfur is preferably used. The compounding amount of the cross-linking agent is preferably 0.1 to 15 parts by weight, more preferably 0.5 to 5 parts by weight, particularly preferably 1 to 4 parts by weight relative to 100 parts by weight of the rubber ingredient in the rubber composition.

Furthermore, besides the ingredients above, necessary amounts of compounding agents such as a cross-linking accelerator, a cross-linking activator, an antioxidant, a filler (excluding the silica and carbon black described above), an activating agent, a process oil, a plasticizer, a lubricant, and a tackifier can be compounded with the rubber composition according to the present invention in accordance with ordinary methods.

If sulfur or a sulfur-containing compound is used as the cross-linking agent, use in combination with a cross-linking accelerator and a cross-linking activator is preferred. Examples of the cross-linking accelerator include sulfenamide-based cross-linking accelerators; guanidine-based cross-linking accelerators; thiourea-based cross-linking accelerators; thiazole-based cross-linking accelerators; thiuram-based cross-linking accelerators; dithiocarbamic acid-based cross-linking accelerators; xanthic acid-based cross-linking accelerators; and the like. Among these, preferred are those containing sulfenamide-based cross-linking accelerators. These cross-linking accelerators are used alone or in combination. The compounding amount of the cross-linking accelerator is preferably 0.1 to 15 parts by weight, more preferably 0.5 to 5 parts by weight, particularly preferably 1 to 4 parts by weight relative to 100 parts by weight of the rubber ingredient in the rubber composition.

Examples of the cross-linking activator include higher fatty acids such as stearic acid; zinc oxide; and the like. These cross-linking activators are used alone or in combination. The compounding amount of the cross-linking activator is preferably 0.05 to 20 parts by weight, particularly preferably 0.5 to 15 parts by weight relative to 100 parts by weight of the rubber ingredient in the rubber composition.

To obtain the rubber composition according to the present invention, it is sufficient to knead the ingredients according to an ordinary method. For example, the target composition can be obtained by kneading ingredients excluding thermally unstable ingredients such as the cross-linking agent and the cross-linking accelerator with the modified conjugated diene rubber, and then mixing the thermally unstable ingredients such as the cross-linking agent and the cross-linking accelerator with the kneaded product. The kneading temperature during kneading of the ingredients excluding the thermally unstable ingredients with the modified conjugated diene rubber is preferably 80 to 200° C., more preferably 120 to 180° C., and the kneading time is preferably 30 seconds to 30 minutes. The kneaded product is mixed with the thermally unstable ingredients after it is cooled to usually 100° C. or less, preferably 80° C. or less.

<Cross-Linked Rubber>

The cross-linked rubber according to the present invention is prepared by cross-linking the above-mentioned rubber composition according to the present invention.

The cross-linked rubber according to the present invention can be produced using the rubber composition according to the present invention, for example, by shaping the rubber composition, for example, with a molding machine, an extruder, an injection molding machine, a press, a roll, or the like having a desired shape, and performing a cross-linking reaction by heating to provide a cross-linked rubber having a fixed shape. In this case, the rubber composition may be preliminarily shaped and then cross-linked, or may be shaped and cross-linked at the same time. The shaping temperature is usually 10 to 200° C., preferably 25 to 120° C. The cross-linking temperature is usually 100 to 200° C., preferably 130 to 190° C., and the cross-linking time is usually 1 minute to 24 hours, preferably 2 minutes to 12 hours, particularly preferably 3 minutes to 6 hours.

Depending on the shape, the size, and the like thereof, the inside of the cross-linked rubber may not be sufficiently cross-linked, even when the surface thereof is cross-linked. For this reason, the cross-linked rubber may be further heated for secondary cross-linking.

As a heating method, a common method used to cross-link rubber such as press heating, steam heating, oven heating, or hot air heating can be appropriately selected.

The cross-linked rubber according to the present invention thus obtained is prepared using the above-mentioned modified conjugated diene rubber according to the present invention, and has high wet grip, excellently low heat buildup, and high operation stability. In particular, the modified conjugated diene rubber according to the present invention comprises is prepared by copolymerizing the conjugated diene compound and the vinyl compound having a functional group interactive with silica and introducing the modifying structure derived from the siloxane compound, resulting in high compatibility with the filler such as silica due to the nature of these structures. Thus, the filler such as silica can be well dispersed, and further the reinforcing properties of the filler such as silica can be sufficiently demonstrated. Accordingly, the cross-linked rubber according to the present invention obtained using such a modified conjugated diene rubber according to the present invention has high wet grip, excellently low heat buildup, and high operation stability.

Owing to such high wet grip, excellently low heat buildup, and high operation stability, the cross-linked rubber according to the present invention can be used in a variety of applications to parts of tires such as cap treads, base treads, carcasses, sidewalls, and bead parts; materials for industrial products such as hoses, belts, mats, and antivibration rubbers; impact resistance improvers for resins; resin film buffer agents; shoe soles; rubber shoes; golf balls; toys; and the like, for example. In particular, because of its high wet grip, excellently low heat buildup and high operation stability, the cross-linked rubber according to the present invention can be suitably used as a material for tires, particularly a material for tires with low energy consumption, and is most suitable for applications to treads.

EXAMPLES

Hereinafter, the present invention will be described in more details with reference to Examples, but these Examples should not be construed as limitations to the present invention. Hereinafter, "parts" is on a weight basis unless otherwise specified weight. The tests and the evaluations were performed as follows.

[Weight Average Molecular Weight, Molecular Weight Distribution]

The weight average molecular weight (Mw) and the molecular weight distribution (Mw/Mn) were determined based on the chart of the molecular weight determined by gel permeation chromatography relative to polystyrene standards. The measurement by gel permeation chromatography was performed on the following conditions:

Apparatus for measurement: high performance liquid chromatograph (available from Tosoh Corporation, trade name "HLC-8220")

Columns: two columns available from Tosoh Corporation, trade name "QMH-HR-H", which were connected in series.

Detector: differential refractometer

Eluent: tetrahydrofuran

Column temperature: 40° C.

[Microstructure]

The styrene monomer unit content, the bis(diethylamino) methylvinylsilane monomer unit content, and the vinyl bond content were measured by $^1$H-WR.

[Roll Adhesion of Rubber Composition]

The prepared rubber composition was shaped into a sheet with a 50° C. open roll mill. The sheet-shaped rubber composition obtained at this time was peeled from the surface of the open roll mill, and the state during the peeling was evaluated according to the following criteria:

A: The rubber composition is easily peeled from the surface of the open roll mill without adhering to the roll. The sheet-shaped rubber composition has a sufficiently smooth surface because there is no adhesion to the roll.

F: The rubber composition is difficult to peel from the surface of the open roll mill with significant adhesion to the roll. The sheet-shaped rubber composition has an inferior surface smoothness because of the significant adhesion to the roll.

[Wet Grip of Cross-Linked Rubber]

The wet grip was evaluated by measuring the tan δ value at 0° C. of the cross-linked rubber test piece having a length of 50 mm, a width of 12.7 mm, and a thickness of 2 mm using an ARES available from Rheometrics at a dynamic strain of 0.5% and 10 Hz. The tan δ value was shown as an index where the measured value of Comparative Example 2 was 100. A larger index indicates higher wet grip.

[Low Heat Buildup of Cross-Linked Rubber]

The heat buildup was evaluated by measuring the tan δ value at 60° C. of the cross-linked rubber test piece having a length of 50 mm, a width of 12.7 mm, and a thickness of 2 mm using an ARES available from Rheometrics at a dynamic strain of 2.5% and 10 Hz. In Examples 1 to 4 and Comparative Examples 1 and 3, the tan δ value was shown as an index where the measured value of Comparative Example 2 was 100. In Example 5 and Comparative Example 5, it was shown as an index where the measured value of Comparative Example 4 was 100. A smaller index indicates lower heat buildup.

[Operation Stability of Cross-Linked Rubber]

According to JIS K6301, the operation stability was evaluated by performing a tensile test on the cross-linked rubber test piece, and measuring and calculating the value expressed by (stress at 300% elongation)/(stress at 100% elongation). A greater numeric value indicates higher reinforcing properties of silica and higher operation stability.

Example 1

Under a nitrogen atmosphere, 792 g of cyclohexane, 1.41 mmol of tetramethylethylenediamine, 76.3 g of 1,3-butadiene, 28.7 g of styrene, and 0.144 g of bis(diethylamino) methylvinylsilane (the compound represented by General Formula (3) where $X^9$ is a chemical single bond, $X^{10}$ and $X^{11}$ are a diethylamino group, and $X^{12}$ is a methyl group) were placed into an autoclave with a stirrer, and then 0.98 mmol of n-butyllithium was added thereto to initiate polymerization at 60° C. The polymerization reaction was continued for 60 minutes. It was confirmed that the polymerization conversion ratio reached a range of 95% to 100%, and then a polyorganosiloxane represented by General Formula (7) was added in an amount of 1.00 mmol (in terms of the —Si—O— repeating unit content) and was reacted for 30 minutes. Subsequently, methanol as a polymerization terminator was added in a 2-fold equimolar amount to the amount of n-butyllithium used to prepare a solution containing a modified conjugated diene rubber. 0.20 parts of IRGANOX 1520L (available from BASF SE) as an antioxidant relative to 100 parts of the modified conjugated diene rubber was added to the solution. Thereafter, the solvent was removed by steam stripping, followed by vacuum drying at 60° C. for 24 hours to yield a solid modified conjugated diene rubber. The resulting modified conjugated diene rubber of Example 1 had a weight average molecular weight (Mw) of 375,000, a styrene monomer unit content of 27 wt %, and a vinyl bond content of 59 wt %. The bis(diethylamino)methylvinylsilane monomer unit content in the modified conjugated diene rubber of Example 1 was 0.15 wt %.

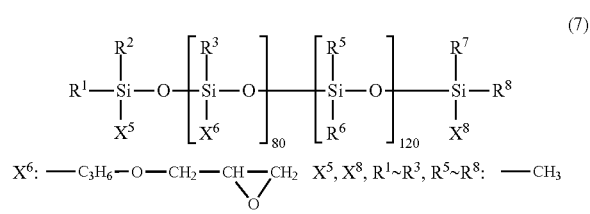

Example 2

Under a nitrogen atmosphere, 792 g of cyclohexane, 1.41 mmol of tetramethylethylenediamine, 76.3 g of 1,3-butadiene, 28.7 g of styrene, and 0.144 g of bis(diethylamino) methylvinylsilane (the compound represented by General Formula (3) where $X^9$ is a chemical single bond, $X^{10}$ and $X^{11}$ are a diethylamino group, and $X^{12}$ is a methyl group) were placed into an autoclave with a stirrer, and then 0.98 mmol of n-butyllithium was added thereto to initiate polymerization at 60° C. The polymerization reaction was continued for 60 minutes. It was confirmed that the polymerization conversion ratio reached a range of 95% to 100%, and then a polyorganosiloxane represented by General Formula (7) was added in an amount of 2.51 mmol (in terms of the —Si—O— repeating unit content) and was reacted for 20 minutes. Then, 2.35 mmol of n-butyllithium was added and reacted for 30 minutes. Subsequently, methanol as a polymerization terminator was added in a 2-fold equimolar amount to the amount of n-butyllithium used to prepare a solution containing a modified conjugated diene rubber. 0.20 parts of IRGANOX 1520L (available from BASF SE) as an antioxidant relative to 100 parts of the modified conjugated diene rubber was added to the solution. Thereafter, the solvent was removed by steam stripping, followed by vacuum drying at 60° C. for 24 hours to yield a solid modified conjugated diene rubber. The resulting modified conjugated diene rubber of Example 2 had a weight average molecular weight (Mw) of 472,000, a styrene monomer unit content of 27 wt %, and a vinyl bond content of 59 wt %. The bis(diethylamino)methylvinylsilane monomer unit content in the modified conjugated diene rubber of Example 2 was 0.15 wt %.

Example 3

A modified solid conjugated diene rubber was prepared in the same manner as in Example 1 except that 0.144 g of bis(diethylamino)methylvinylsilane in Example 1 was replaced with 0.135 g of m/p-pyrrolidinoethylstyrene (a mixture of m-pyrrolidinoethylstyrene and p-pyrrolidinoethylstyrene). The resulting conjugated diene rubber of Example 3 had a weight average molecular weight (Mw) of 546,000, a styrene monomer unit content of 27 wt %, and a vinyl bond content of 58 wt %. The m/p-pyrrolidinoethylstyrene monomer unit content in the conjugated diene rubber of Example 3 was 0.13 wt %.

Example 4

Under a nitrogen atmosphere, 792 g of cyclohexane, 1.41 mmol of tetramethylethylenediamine, 0.98 mmol of piperidine, 76.3 g of 1,3-butadiene, 28.7 g of styrene, and 0.144 g of bis(diethylamino)methylvinylsilane (the compound represented by General Formula (3) where $X^9$ is a chemical single bond, $X^{10}$ and $X^{11}$ are a diethylamino group, and $X^{12}$ is a methyl group) were placed into an autoclave with a stirrer, and then 0.98 mmol of n-butyllithium was added thereto to initiate polymerization at 60° C. The polymerization reaction was continued for 60 minutes. It was confirmed that the polymerization conversion ratio reached a range of 95% to 100%, and then a polyorganosiloxane represented by General Formula (7) was added in an amount of 2.51 mmol (in terms of the —Si—O— repeating unit content) and was reacted for 20 minutes. Then, 2.35 mmol of n-butyllithium was added and reacted for 30 minutes. Subsequently, methanol as a polymerization terminator was added in a 2-fold equimolar amount to the amount of n-butyllithium used to prepare a solution containing a modified conjugated diene rubber. 0.20 parts of IRGANOX 1520L (available from BASF SE) as an antioxidant relative to 100 parts of the modified conjugated diene rubber was added to the solution. Thereafter, the solvent was removed by steam stripping, followed by vacuum drying at 60° C. for 24 hours to yield a solid modified conjugated diene rubber. The resulting modified conjugated diene rubber of Example 4 had a weight average molecular weight (Mw) of 409,000, a styrene monomer unit content of 27 wt %, and a vinyl bond content of 60 wt %. The bis(diethylamino)methylvinylsilane monomer unit content in the modified conjugated diene rubber of Example 4 was 0.15 wt %.

Comparative Example 1

Under a nitrogen atmosphere, 792 g of cyclohexane, 1.41 mmol of tetramethylethylenediamine, 76.3 g of 1,3-butadiene, 28.7 g of styrene, and 0.144 g of bis(diethylamino)methylvinylsilane were placed into an autoclave with a stirrer, and then 0.98 mmol of n-butyllithium was added thereto to initiate polymerization at 60° C. The polymerization reaction was continued for 60 minutes. It was confirmed that the polymerization conversion ratio reached a range of 95% to 100%, and then methanol as a polymerization terminator was added in a 2-fold equimolar amount to the amount of n-butyllithium used to prepare a solution containing a conjugated diene rubber. 0.20 parts of IRGANOX 1520L (available from BASF SE) as an antioxidant relative to 100 parts of the conjugated diene rubber was added to the solution. Thereafter, the solvent was removed by steam stripping, followed by vacuum drying at 60° C. for 24 hours to yield a solid conjugated diene rubber. The resulting conjugated diene rubber of Comparative Example 1 had a weight average molecular weight (Mw) of 218,000, a styrene monomer unit content of 27 wt %, and a vinyl bond content of 59 wt %. The bis(diethylamino)methylvinylsilane monomer unit content in the conjugated diene rubber of Comparative Example 1 was 0.15 wt %.

Comparative Example 2

Under a nitrogen atmosphere, 792 g of cyclohexane, 1.41 mmol of tetramethylethylenediamine, 76.3 g of 1,3-butadiene, and 28.7 g of styrene were placed into an autoclave with a stirrer, and then 0.98 mmol of n-butyllithium was added thereto to initiate polymerization at 60° C. The polymerization reaction was continued for 60 minutes. It was confirmed that the polymerization conversion ratio reached a range of 95% to 100%, and then a polyorganosiloxane represented by General Formula (7) was added in an amount of 1.00 mmol (in terms of the —Si—O— repeating unit content) and was reacted for 30 minutes. Then, methanol as a polymerization terminator was added in a 2-fold equimolar amount to the amount of n-butyllithium used to prepare a solution containing a modified conjugated diene rubber. 0.20 parts of IRGANOX 1520L (available from BASF SE) as an antioxidant relative to 100 parts of the modified conjugated diene rubber was added to the solution. Thereafter, the solvent was removed by steam stripping, followed by vacuum drying at 60° C. for 24 hours to yield a solid modified conjugated diene rubber. The resulting modified conjugated diene rubber of Comparative Example 2 had a weight average molecular weight (Mw) of 456,000, a styrene monomer unit content of 27 wt %, and a vinyl bond content of 59 wt %.

Comparative Example 3

A solid conjugated diene rubber was prepared in the same manner as in Comparative Example 1 except that 0.144 g of bis(diethylamino)methylvinylsilane in Example 1 was replaced with 0.135 g of m/p-pyrrolidinoethylstyrene. The resulting conjugated diene rubber of Comparative Example 3 had a weight average molecular weight (Mw) of 246,000, a styrene monomer unit content of 27 wt %, and a vinyl bond content of 59 wt %. The m/p-pyrrolidinoethylstyrene monomer unit content in the conjugated diene rubber of Comparative Example 3 was 0.13 wt %.

[Production and Evaluation of Rubber Composition and Cross-Linked Rubber]

In a 250-ml Brabender type mixer, 100 parts of the modified conjugated diene rubber of Example 1 was masticated for 30 seconds. In the next step, 50 parts of silica (available from Rhodia S.A., trade name "Zeosil 1115MP"), 50 parts of process oil (trade name "AROMAX T-DAE", available from Nippon Oil Corporation), and 6.0 parts of bis(3-(triethoxysilyl)propyl)tetrasulfide as a silane coupling agent (available from Degussa AG, trade name "Si69") were added, and were kneaded for 1.5 minutes at a starting temperature of 110° C. Thereafter, 25 parts of silica (available from Rhodia S.A., trade name "Zeosil 1115MP"), 3 parts of zinc oxide, 2 parts of stearic acid, and 2 parts of N-phenyl-N'-(1,3-dimethylbutyl)-p-phenylenediamine as an antioxidant (available from Ouchi Shinko Chemical Industrial Co., Ltd., trade name "NOCRAC 6C") were added, and were further kneaded for 2.5 minutes. The kneaded product was discharged from the mixer. When the kneading was completed, the temperature of the kneaded product was 150° C. After cooled to room temperature, the kneaded product was kneaded for 2 minutes at a starting temperature of 110° C. in the Brabender type mixer, and was discharged from the mixer. In the next step, 1.40 parts of sulfur, 1.2 parts of N-tert-butyl-2-benzothiazolylsulfenamide as a cross-linking accelerator (trade name "NOCCELER NS-P", available from Ouchi Shinko Chemical Industrial Co., Ltd.) and 1.2 parts of 1,3-diphenylguanidine (trade name "NOCCELER D", available from Ouchi Shinko Chemical Industrial Co., Ltd.) were added to and kneaded with the kneaded product with a 50° C. open roll mill to prepare a rubber composition.

The resulting rubber composition was shaped into a sheet with the 50° C. open roll mill. At this time, the roll adhesion of the rubber composition was evaluated according to the method described above. The results are shown in Table 1.

The sheet-shaped rubber composition was press cross-linked at 160° C. for 20 minutes to prepare a cross-linked rubber test piece. Using this test piece, the wet grip, the heat buildup, and the operation stability were evaluated. The results are shown in Table 1.

For the modified conjugated diene rubbers of Examples 2 to 4, the conjugated diene rubbers of Comparative Example 1 and 3, and the modified conjugated diene rubber of Comparative Example 2, the preparation of rubber compositions and the evaluation of the roll adhesion of the rubber compositions were performed in the same manner as above. The preparation of cross-linked rubber test pieces and the evaluation of the wet grip, the heat buildup, and the operation stability were also performed in the same manner as above. The results are shown in Table 1.

TABLE 1

|  | Example 1 | Example 2 | Example 3 | Example 4 | Comparative Example 1 | Comparative Example 2 | Comparative Example 3 |
| --- | --- | --- | --- | --- | --- | --- | --- |
| Modification at initiation-side terminal | No | No | No | Piperidine | No | No | No |
| Vinyl compound having functional group interactive with silica | N-Si-N | N-Si-N | m/p-pyrrolidinoethylstyrene | N-Si-N | N-Si-N | Not used | m/p-pyrrolidinoethylstyrene |
| Content (wt %) of unit of vinyl compound having functional group interactive with silica | 0.15 | 0.15 | 0.13 | 0.15 | 0.15 | 0 | 0.13 |
| Modifier reacted with active terminal of polymer chain | Polyorganosiloxane | Polyorganosiloxane | Polyorganosiloxane | Polyorganosiloxane | Not used | Polyorganosiloxane | Not used |
| Weight average molecular weight (Mw) of (modified) conjugated diene rubber | 375,000 | 472,000 | 546,000 | 409,000 | 218,000 | 456,000 | 246,000 |
| Roll adhesion | A | A | A | A | F | F | F |
| Wet grip | 107 | 107 | 103 | 104 | 100 | 100 | 91 |
| Heat buildup | 88 | 84 | 92 | 76 | 120 | 100 | 159 |
| Operation stability (300% tensile stress/ 100% tensile stress) | 5.42 | 5.44 | 5.43 | 5.90 | 5.36 | 5.21 | 4.98 |

[Evaluation of Examples 1 to 4 and Comparative Examples 1 to 3]

As seen in Table 1, the rubber compositions prepared from the modified conjugated diene rubbers in which the modifying structure derived from the siloxane compound was introduced to at least one terminal of the polymer chain containing conjugated diene monomer unit and monomer unit of the vinyl compound having a functional group interactive with silica were effectively prevented from adhering to the rolls, which indicates that the rubbers can ensure high processability. In addition, the cross-linked rubbers prepared from the compositions had excellently low heat buildup, high wet grip, and high operation stability (Examples 1 to 4).

The use of the conjugated diene rubbers having a polymer chain without the terminal modifying structure derived from the siloxane compound resulted in rubber compositions which remarkably adhered to rolls, and the cross-linked rubbers prepared therefrom had unsatisfactory heat buildup, poor wet grip, and poor operation stability (Comparative Examples 1 and 3).

Likewise, the use of the modified conjugated diene rubber having a polymer chain without the monomer unit of the vinyl compound having a functional group interactive with silica resulted in a rubber composition which remarkably adhered to the rolls, and the cross-linked rubber prepared therefrom had unsatisfactory heat buildup, poor wet grip, and poor operation stability (Comparative Example 2).

Example 5

Under a nitrogen atmosphere, 830 g of cyclohexane, 1.28 mmol of tetramethylethylenediamine, 80.3 g of 1,3-butadiene, 29.7 g of styrene, and 0.066 g of bis(diethylamino)methylvinylsilane were placed into an autoclave with a stirrer, and then 0.80 mmol of n-butyllithium was added thereto to initiate polymerization at 60° C. The polymerization reaction was continued for 60 minutes. It was confirmed that the polymerization conversion ratio reached a range of 95% to 100%, and then 0.30 mmol of N,N-dimethylaminopropylacrylamide was added and reacted for 15 minutes. Then, a polyorganosiloxane represented by General Formula (7) was added in an amount of 0.33 mmol (in terms of the —Si—O— repeating unit content) and was reacted for 30 minutes. Subsequently, methanol as a polymerization terminator was added in a 2-fold equimolar amount to the amount of n-butyllithium used to prepare a solution containing a conjugated diene rubber. 0.15 parts of an antioxidant (IRGANOX 1520L, available from BASF SE) relative to 100 parts of the conjugated diene rubber was added to the solution. Thereafter, the solvent was removed by steam stripping, followed by vacuum drying at 60° C. for 24 hours to yield a solid conjugated diene rubber. The resulting conjugated diene rubber of Example 5 had a weight average molecular weight (Mw) of 254,000, a styrene monomer unit content of 27 wt %, and a vinyl bond content of 58 wt %. The bis(diethylamino)methylvinylsilane monomer unit content in the conjugated diene rubber of Example 5 was 0.060 wt %.

Comparative Example 4

Under a nitrogen atmosphere, 830 g of cyclohexane, 1.28 mmol of tetramethylethylenediamine, 0.61 mmol of piperidine, 80.3 g of 1,3-butadiene, 29.7 g of styrene, and 0.132 g of bis(diethylamino)methylvinylsilane were placed into an autoclave a stirrer, and then 0.80 mmol of n-butyllithium was added thereto to initiate polymerization at 60° C. The polymerization reaction was continued for 60 minutes. It was confirmed that the polymerization conversion ratio reached a range of 95% to 100%, and then 0.61 mmol of N-phenylpyrrolidone was added and reacted for 30 minutes. Subsequently, methanol as a polymerization terminator was added in a 2-fold equimolar amount to the amount of n-butyllithium used to prepare a solution containing a conjugated diene rubber. 0.15 parts of an antioxidant (IRGANOX 1520L, available from BASF SE) relative to 100 parts of the conjugated diene rubber was added to the solution. Thereafter, the solvent was removed by steam stripping, followed by vacuum drying at 60° C. for 24 hours to yield a solid conjugated diene rubber. The resulting conjugated diene rubber of Comparative Example 4 had a weight average molecular weight (Mw) of 340,000, a styrene monomer unit content of 26 wt %, and a vinyl bond content of 57 wt %. The bis(diethylamino)methylvinylsilane monomer unit content in the conjugated diene rubber of Comparative Example 4 was 0.12 wt %.

Comparative Example 5

Under a nitrogen atmosphere, 830 g of cyclohexane, 1.28 mmol of tetramethylethylenediamine, 80.3 g of 1,3-butadiene, and 29.7 g of styrene were placed into an autoclave with a stirrer, and then 0.80 mmol of n-butyllithium was added thereto to initiate polymerization at 60° C. The polymerization reaction was continued for 60 minutes. It was confirmed that the polymerization conversion ratio reached a range of 95% to 100%, and then 0.30 mmol of N,N-dimethylaminopropylacrylamide was added and reacted for 15 minutes. Thereafter, a polyorganosiloxane represented by General Formula (7) was added in an amount of 0.33 mmol (in terms of the —Si—O— repeating unit content) and was reacted for 30 minutes. Subsequently, methanol as a polymerization terminator was added in a 2-fold equimolar amount to the amount of n-butyllithium used to prepare a solution containing a conjugated diene rubber. 0.15 parts of an antioxidant (IRGANOX 1520L, available from BASF SE) relative to 100 parts of the conjugated diene rubber was added to this solution. Thereafter, the solvent was removed by steam stripping, followed by vacuum drying at 60° C. for 24 hours to yield a solid conjugated diene rubber. The resulting conjugated diene rubber of Comparative Example 5 had a weight average molecular weight (Mw) of 399,000, a styrene monomer unit content of 26 wt %, and a vinyl bond content of 57 wt %.

Also for the modified conjugated diene rubber of Example 5 and the modified conjugated diene rubbers Comparative Examples 4 and 5, the cross-linked rubber test pieces were prepared in the same manner as in Example 1 to evaluate the heat buildup. The results are shown in Table 2.

TABLE 2

|  | Example 5 | Comparative Example 4 | Comparative Example 5 |
| --- | --- | --- | --- |
| Modification at initiation-side terminal | No | Piperidine | No |
| Vinyl compound having functional group interactive with silica | 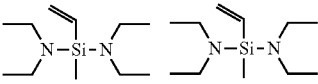 | 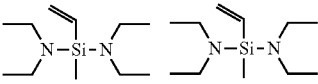 | Not used |
| Content (wt %) of unit of vinyl compound having functional group interactive with silica | 0.060 | 0.12 | 0 |
| Modifier (1) reacted with active terminal of polymer chain | N,N-dimethylaminopropylacrylamide | N-phenylpyrrolidone | N,N-dimethylaminopropylacrylamide |

TABLE 2-continued

|  | Example 5 | Comparative Example 4 | Comparative Example 5 |
| --- | --- | --- | --- |
| Modifier (2) reacted with active terminal of polymer chain | Polyorganosiloxane | Not used | Polyorganosiloxane |
| Weight average molecular weight (Mw) of (modified) conjugated diene rubber | 254,000 | 340,000 | 399,000 |
| Heat buildup | 90 | 100 | 145 |

[Evaluation of Example 5 and Comparative Examples 4 and 5]

As seen in Table 2, also in the case where two compounds (the siloxane compound and the compound other than the siloxane compound) were used as modifiers for the active terminal of the polymer chain and were sequentially reacted therewith, the cross-linked rubber prepared from the modified conjugated diene rubber thus prepared had excellently low heat buildup (Example 5). Similarly to Examples 1 to 4, the rubber composition prepared in Example 5 was also effectively prevented from adhering to the rolls, which indicates its excellent processability. In addition, the cross-linked rubber prepared therefrom had high wet grip and operation stability as well as low heat buildup.

In contrast, in the case where the compound other than the siloxane compound as a modifier was reacted with the active terminal of the polymer chain and the case where the vinyl compound having a functional group interactive with silica was not copolymerized although the two compounds (the siloxane compound and the compound other than the siloxane compound) were used, the heat buildup was unsatisfactory (Comparative Examples 4 and 5).

The invention claimed is:

1. A modified conjugated diene rubber having a modifying structure derived from a siloxane compound on at least one terminal of a polymer chain containing conjugated diene monomer unit and a monomer unit of a vinyl compound having a functional group interactive with silica, wherein the monomer unit of a vinyl compound having a functional group interactive with silica is represented by General Formula (1):

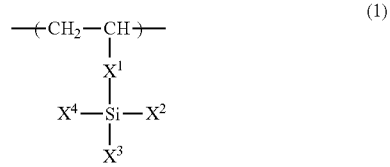

where $X^1$ represents a chemical single bond or a hydrocarbylene group, and $X^2$, $X^3$, and $X^4$ each independently represent a hydroxyl group, a substituted amino group, a hydrocarbyloxy group, or an optionally substituted hydrocarbyl group.

2. The modified conjugated diene rubber according to claim 1, wherein the siloxane compound is a polyorganosiloxane represented by General Formula (2):

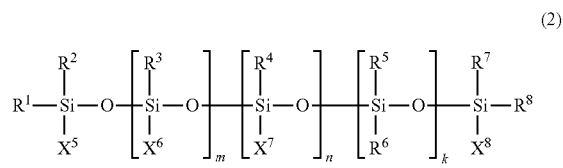

where $R^1$ to $R^8$, which may be the same or different, are a $C_1$ to $C_6$ alkyl or $C_6$ to $C_{12}$ aryl group; $X^5$ and $X^8$, which may be the same or different, are any of those selected from the group consisting of $C_1$ to $C_6$ alkyl groups, $C_6$ to $C_{12}$ aryl groups, $C_1$ to $C_5$ alkoxy groups, and $C_4$ to $C_{12}$ groups having an epoxy group; $X^6$ is a $C_1$ to $C_5$ alkoxy group or a $C_4$ to $C_{12}$ group having an epoxy group, and when a plurality of $X^6$s is present, these may be the same or different; $X^7$ is a group containing 2 to 20 repeating unit of an alkylene glycol, and when a plurality of $X^7$s is present, these may be the same or different; m is an integer of 1 to 200; n is an integer of 0 to 200; k is an integer of 0 to 200; and m+n+k is 1 or more.

3. A method for producing the modified conjugated diene rubber according to claim 1, comprising the steps of:

polymerizing monomers including a conjugated diene compound and the vinyl compound having a functional group interactive with silica in an inert solvent, thereby providing a conjugated diene polymer chain having an active terminal; and reacting the siloxane compound with the active terminal of the conjugated diene polymer chain having an active terminal.

4. A rubber composition comprising:

a rubber ingredient containing the modified conjugated diene rubber according to claim 1; and silica.

5. The rubber composition according to claim 4, further comprising a cross-linking agent.

6. A cross-linked rubber prepared by cross-linking the rubber composition according to claim 4.

7. A tire comprising the cross-linked rubber according to claim 6.

* * * * *